Feb. 16, 1943.　　　　N. J. BENO　　　　2,311,430
SCRATCH RESISTANCE TESTING MACHINE
Filed Jan. 14, 1941　　　　4 Sheets-Sheet 1
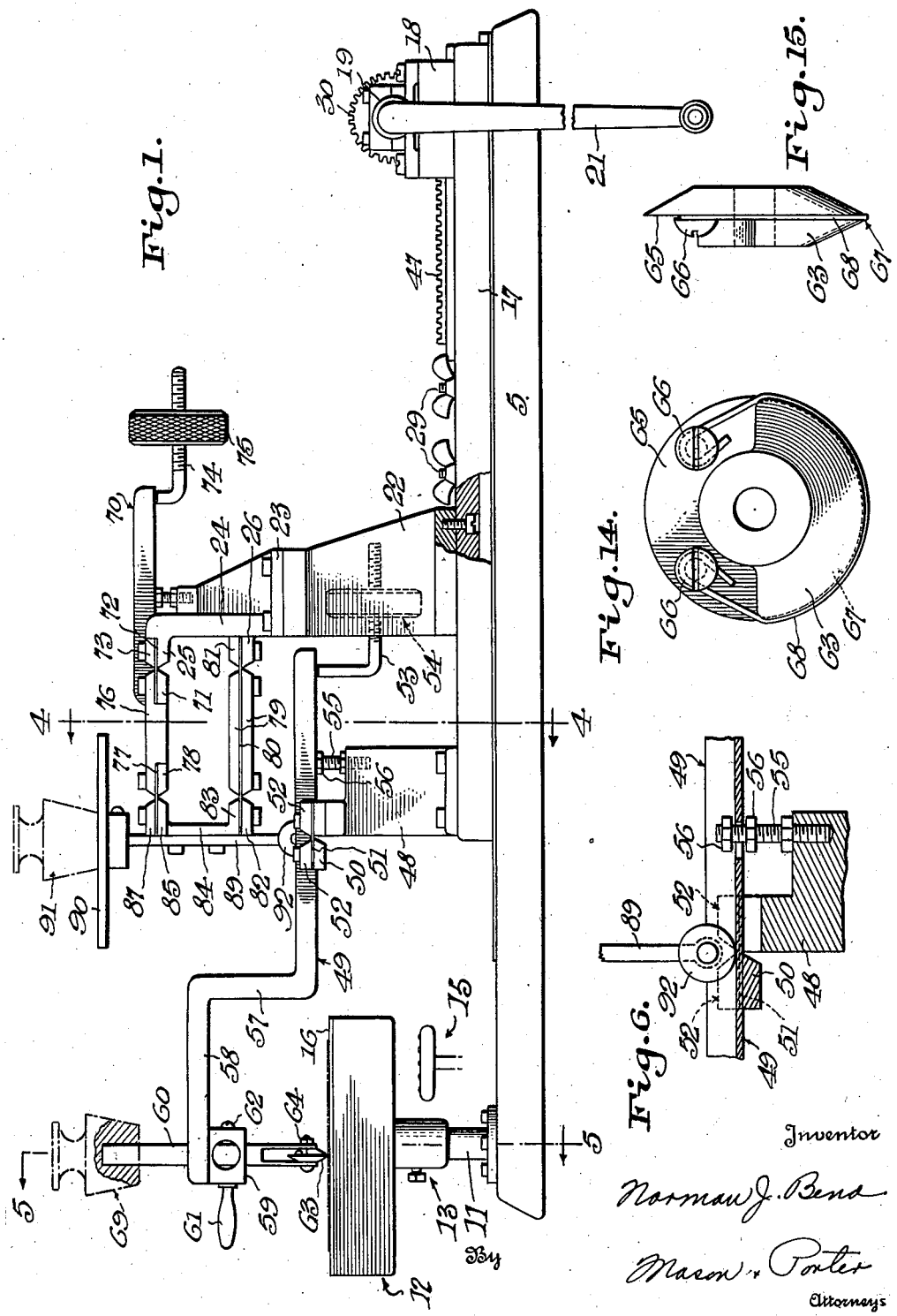

Feb. 16, 1943. N. J. BENO 2,311,430
SCRATCH RESISTANCE TESTING MACHINE
Filed Jan. 14, 1941 4 Sheets-Sheet 2
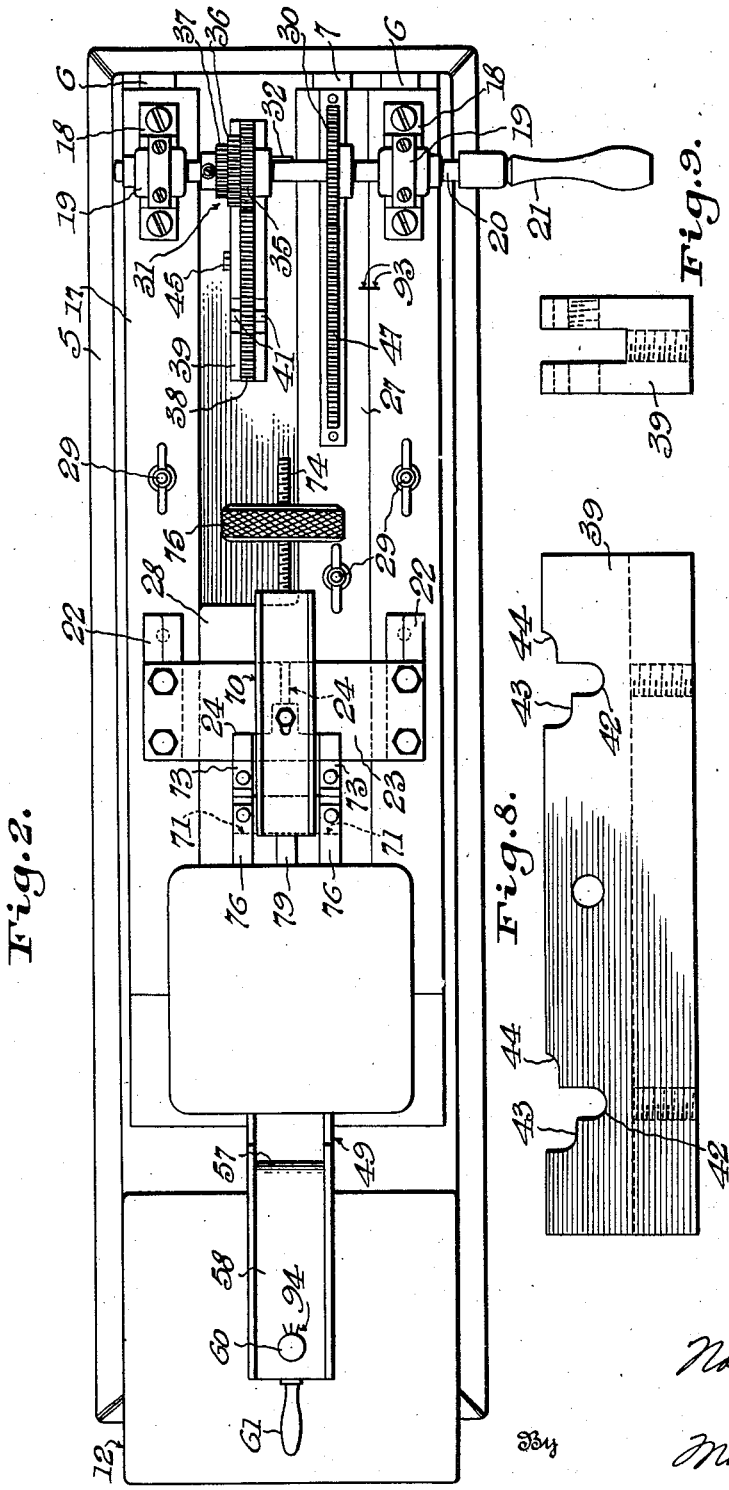

Feb. 16, 1943.  N. J. BENO  2,311,430
SCRATCH RESISTANCE TESTING MACHINE
Filed Jan. 14, 1941  4 Sheets-Sheet 3
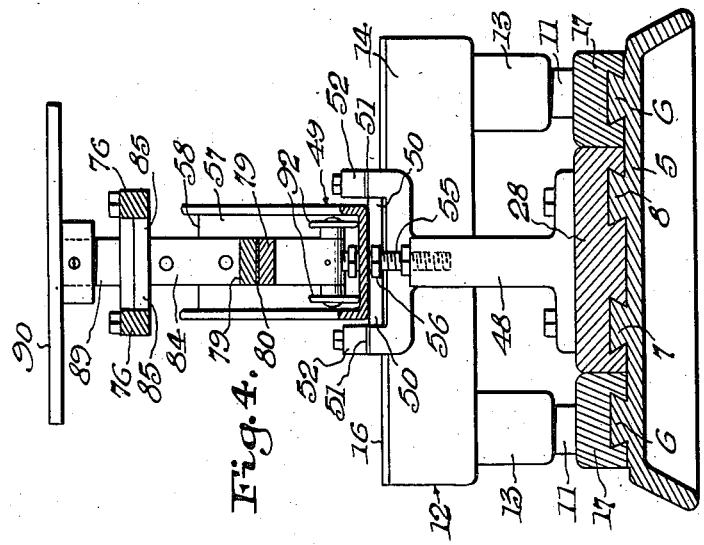
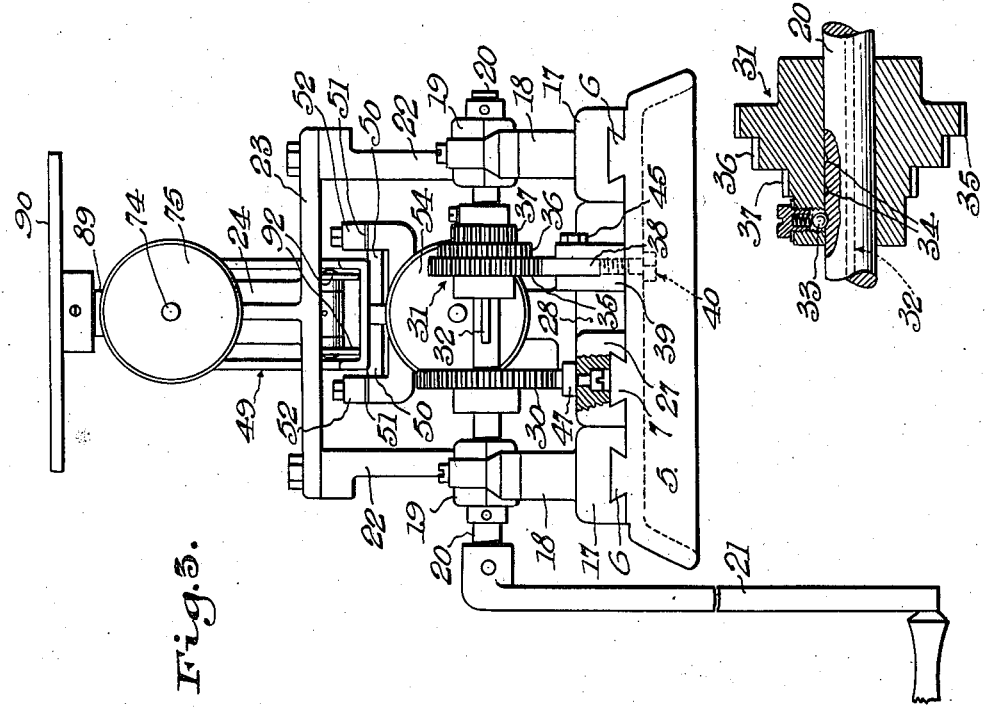
Inventor
Norman J. Beno
By Mason & Porter
Attorneys Feb. 16, 1943. N. J. BENO 2,311,430
SCRATCH RESISTANCE TESTING MACHINE
Filed Jan. 14, 1941 4 Sheets-Sheet 4
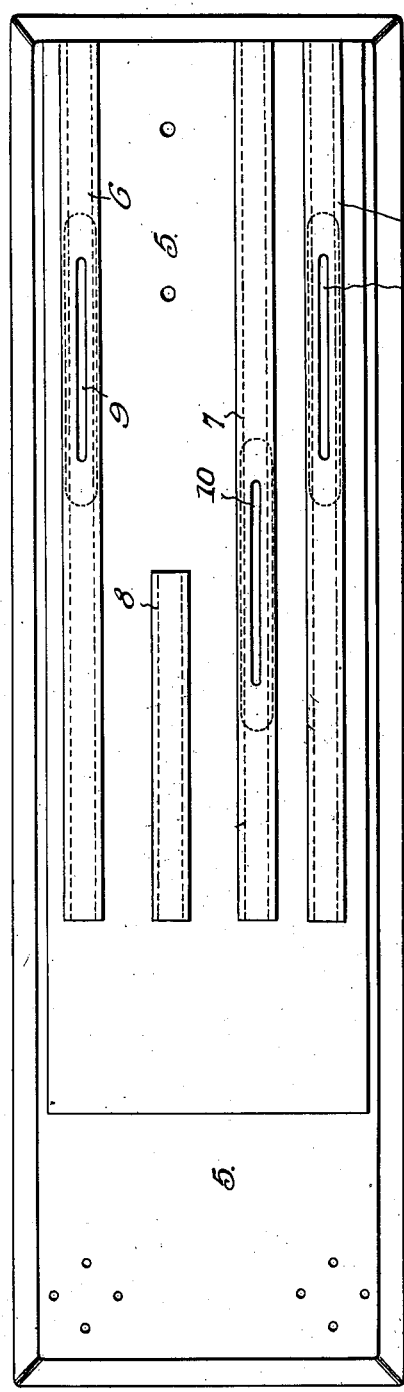
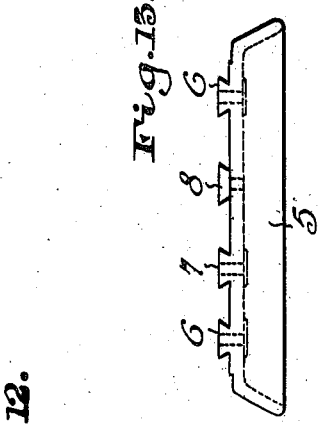
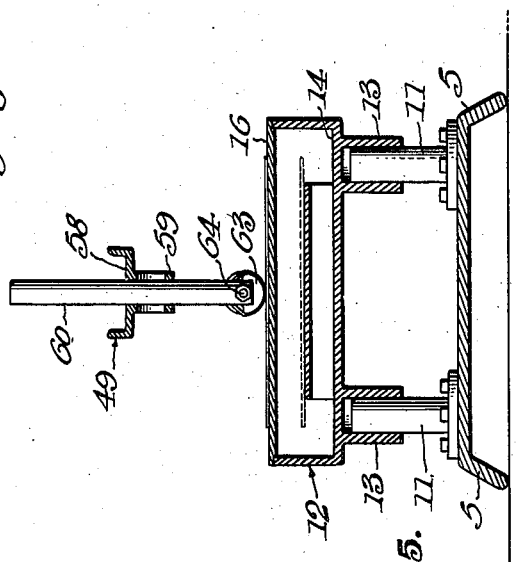

Patented Feb. 16, 1943

2,311,430

UNITED STATES PATENT OFFICE 2,311,430

SCRATCH RESISTANCE TESTING MACHINE

Norman J. Beno, Chicago, Ill., assignor to Continental Can Company, Inc., New York, N. Y., a corporation of New York Application January 14, 1941, Serial No. 374,382

15 Claims. (Cl. 73—51)

The invention relates generally to testing machinery and primarily seeks to provide a simple, inexpensively constructed and efficiently operable machine for testing the quality of sheet coatings by scratching said coatings and observing the resistance of the coatings to said scratching.

Sheets intended for use in the manufacture of metal containers usually bear protective and decorative surface coatings of varnish, lacquer, enamel or lithograph inks, and it is desirable to be able to accurately test the brittleness, plasticity, hardness, toughness, abrasion resistance, cohesion, and adhesion of such coatings in order to determine whether they conform to established standards of the qualities enumerated. Despite the fact that some machines have been developed with an intent to mechanically test such sheet coatings, the finger nail still is the most widely used means for determining coating quality. This is perhaps true because machines previously produced have been complex and expensive and were incapable of producing duplicable, that is repeatedly uniform, results. The coating scratching stylus or tools of such machines were subject to wear and gave varying test results as wear progressed, and it was impossible to perfectly reproduce the scratching surfaces of the tools when replacement was necessary. Again, the stylus or tools of such machines made very narrow scratches in effecting the tests, and irregularities in the films thus being tested seriously affected the results obtained. Another fault of such machines was that they measured the superficial surface hardness or abrasion resistance either singly or in combination but were incapable of evaluating adhesion separately or in combination with the superficial hardness and abrasion resistance. The present invention seeks to provide a novel scratch resistance testing machine structure in which all of the objections noted have been removed.

In its more detailed nature the invention has for an object to provide a scratch resistance testing machine embodying a novel counterbalanced scratching tool support, a novel counterbalanced weight support, a novel coated sheet support, and means for moving the tool support and the weight support individually or collectively to cause the tool to make a test scratch on a supported sheet of a selected length and with a selected constant or uniformly varying weight imposition thereon.

Another object of the invention is to provide a machine of the character stated in which the support moving means includes an actuator and a selective gear couple between the actuator and parts to be moved effective to move said parts selective, predetermined distances.

Another object of the invention is to provide a machine of the character stated in which the coated sheet support embodies means for supporting sheets immersed in a coating softening liquid whenever desired.

Another object of the invention is to provide a machine of the character stated in which the scratching tool support includes a lever fulcrumed at a point substantially in the plane of the sheet to be tested.

Another object of the invention is to provide a machine of the character stated in which the weight support is mounted on a parallel bar equipment effective to cause the scratch depth controlling weight to be imposed in a direction substantially vertical to the plane of the sheet being tested.

Another object of the invention is to provide a machine of the character stated in which the scratching tool comprises a disk with a thin wire presented at its periphery for scratching contact with sheets to be tested and which can be adjusted so as to engage the sheets transversely of the line of scratching movement, or plow fashion, at an acuate angle to said line.

With the above and other objects in view which will more fully appear, the nature of the invention will be more clearly understood by following the description, the appended claims, and the several views illustrated in the accompanying drawings.

In the drawings:

Figure 1 is a side elevation of the machine, applied sheets being illustrated in dot and dash lines on both the weight support and the scratching tool support.

Figure 2 is a plan view of the machine.

Figure 3 is a right hand elevation of the machine.

Figure 4 is a vertical cross section taken on the line 4—4 on Figure 1.

Figure 5 is a vertical cross section taken on the line 5—5 on Figure 1.

Figure 6 is an enlarged fragmentary sectional view illustrating one of the adjustable pivotal movement limiting posts or stop members.

Figure 7 is an enlarged detail sectional view illustrating the shiftable gear cluster and the associated rack.

Figures 8 and 9 are detail views illustrating the rack-receiving bar in side elevation and end view respectively.

Figures 10 and 11 are detail views illustrating the adjustable rack bar in side elevation and end view respectively.

Figures 12 and 13 are detail views illustrating the machine base in plan and end elevation respectively.

Figures 14 and 15 are enlarged detail views illustrating the scratching tool disk in face view and edge view respectively.

In the example of embodiment of the invention herein illustrated, the machine comprises a base 5 equipped with two upstanding dovetail rails 6 disposed in laterally spaced parallel relation, a long intermediate dovetail rail 7, and a shorter intermediate dovetail rail 8, said rails 7 and 8 being disposed in parallel relation between the rails 6. Each of the rails 6 and 7 is provided with a longitudinal slot 9 extending vertically therethrough, the intermediate rail 7 is provided with a similar slot 10, and the purpose of these slots will later become apparent.

Supporting posts 11 project vertically from one end of the base, and a work support 12 is vertically-adjustably mounted on these posts in any approved manner, as by the set screw and mounting sleeve equipment generally designated 13. This support 12 may be in the nature of a hollow tray 14 for receiving water or any other sheet coating, softening liquid which may be kept warm by a suitable heating medium generally designated 15 and mountable on the base beneath the support tray 14 in the manner illustrated in Figure 1. The tray may be closed over by a removable cover plate 16 which will provide a plain top upon which sheets to be tested can be mounted.

A slide rail 17 is slidably mounted on each of the dovetail rails 6 and each rail 17 is equipped at one end with a bearing standard 18. The bearing standards 18 are disposed in opposed relation and each carries a shaft bearing 19 for rotatably supporting a cross shaft 20. In this particular illustration, the shaft is equipped with a crank 21 so that it can be rotated manually at will, but it is to be understood that any suitable form of constant speed motor drive couple may be connected with this shaft for imparting rotation thereto if desired.

The rails 17 also carry bracket standards 22 disposed in opposed relation, and these standards are bridged by a cross plate 23 which supports an upstanding central bracket standard 24 equipped with upper and lower laterally spaced pairs of supporting shelves respectively designated 25 and 26.

A rail 27 is slidably mounted on the dovetail rail 7 and includes a laterally widened portion 28 mounted on the short dovetail rail section 8. See Figures 2 and 12. All of the rails 27 and 17 are equipped with wing-nut bolts 29 which pass through the base slots 9 and 10 and are effective to securely clamp the rails against movement on the base whenever it is desired to hold one or the other of the rail sets 27 or 17 against movement.

A large gear 30 is fixed upon the cross shaft 20, and a cluster gear 31 is splined on said shaft, as at 32, so as to be shiftable along the shaft. The cluster gear 31 is equipped with a spring-pressed ball 33 which is yieldably engageable with selective sockets 34 formed in the shaft for the purpose of securing the gear 31 at selected positions on said shaft. The cluster gear includes a large gear portion 35, a smaller intermediate gear portion 36, and a still smaller, small gear portion 37. By shifting the cluster gear 31 along the shaft 20, one or another of the gear portions 35, 36 and 37 can be presented for meshing with a rack 38 mounted beneath the cluster gear in a grooved supporting rail 39 which is secured upon the base as at 40.

Because of the variation in diameter of the cluster gear portions 35, 36 and 37, it will be obvious that when these gear portions are selectively presented for engagement with the rack 38, the rack must be adjusted vertically in the rail 39 so as to enable the intended rack and gear portion engagement. For this purpose the rack is provided with cross pins 41 which project from the sides thereof and are receivable in seat recesses formed in the upper edges of the mounting rail 39. Each pin receiving recess includes a lowermost seating portion 42 effective to position the rack for engagement with the large gear portion 35, an intermediate seating portion 43 effective to position the rack for engagement with the intermediate gear portion 36, and an uppermost seating portion 44 effective to position the rack for proper engagement with the small gear portion 37. When the rack pins 41 are seated on the proper seating portions 42, 43 and 44, the selected position of the rack 38 is secured by tightening the clamp screw 45 which passess through one side wall of the supporting rail 39 and threads into the opposite side wall of said rail. The rack is provided with a bottom clearance 46 for straddling the clamp screw 45 regardless of the selected position of said rack. See Figures 2, 3 and 8 to 11.

Another rack 47 is fixed to the upper surface of the rail 27 in position for meshing with the large gear 30 fixed on the cross shaft 20. See Figures 1, 2 and 3.

The slidable rails 27, 28 support a bracket standard 48 at one end thereof and which is intended for pivotally mounting a tool supporting lever 49 preferably formed of channel shape in the manner illustrated in Figures 2 and 4 of the drawings. The lever 49 includes a pair of laterally extended ears 50 over which, and over the lateral edges of the standard 48, lie leaf hinge pieces 51, said pieces being clamped in place by clamp pieces 52 which removably oppose said lateral edge portions of the standard 48. The lever 49 includes a depending end extension 53 which is threaded to adjustably receive a counterbalance weight 54. A screw post 55 is supported by the standard 48 and passes through an aperture in the lever 49, said post being equipped with adjustably spaced abutment nuts 56 effective to limit movement of the lever 49 about the pivot or fulcrum provided by the hinge pieces 51.

At its end opposite the counterbalance weight 54, the lever has an upward extension 57 and a horizontally disposed end portion 58 equipped with a depending bearing block 59. The block 59 is equipped with a vertical bore for adjustably receiving a tool standard 60, and is equipped with a handle 61 which may be grasped to facilitate positioning of the lever. A set screw 62 is effective to secure the tool standard 60 in its adjustment positions in the block 59, and the lower end of the tool standard is bifurcated and carries a disk 63 which is clamped in said end as at 64. The disk has a face clearance 65 equipped with a pair of securing screws 66, and is edge grooved as at 67 to receive the coating scratching element which preferably takes the form of a piece of .005" piano wire 68 having its ends secured by the screws 66. See Figures 1, 14 and 15.

In order to directly apply a definite and constant pressure upon the scratching tool while it is in its scratching engagement with an underlying coated sheet, a selective weight 69 may be removably mounted on the lever or tool standard in the manner illustrated in dot and dash lines in Figure 1.

A counterpoise lever 70 is provided and is equipped with a pair of lateral extensions 71, and a pair of leaf hinge pieces 72 overlying the extensions 71 and the adjacent bracket shelf portions 25, are secured thereon by opposed clamp pieces 73 for thus pivotally supporting the lever 70 on the bracket standard 24 in the manner illustrated in Figure 1 of the drawings. The lever 70 has a depending end extension 74 which is threaded to adjustably receive a counterpoise weight 75.

An upper parallel bar 76 is clamped to each lateral extension 71 and the overlying hinge piece portion, and these bars 76 have hinge pieces 77 clamped thereto as at 78 and extended endwise therefrom. Lower two-piece clamp bars 79 are disposed below and in parallel spaced relation to the upper bars 76 and the members 79 clamp hinge pieces 80 between them in position for extending over the standard shelf portions 26 to which they are clamped by clamp pieces 81. The free ends of the hinge pieces 80 at the opposite ends of the members 79 are clamped, as at 82, to the lower shelf portions 83 of a bracket 84 which is also equipped with upper shelf portions 85 engaged by the hinge pieces 77 which extend from the bars 76, being clamped thereto as at 87. The hinge pieces 82 are clamped as at 88 to the upper shelf portions 85. See Figures 1 and 4.

A standard 89 is secured in vertical position to the bracket 84 and carries a weight supporting plate 90 at its upper end for receiving selected weights as shown at 91 in Figure 1. At its lower end, the standard 89 is equipped with a pair of wheels or rollers 92 which engage and ride over the upper surface of the tool supporting lever 49 in the manner illustrated in Figures 1 and 4 of the drawings.

The adjacent rails 17 and 27 may be equipped with score marks 93 which may be brought together to indicate the position which these parts should assume at the commencement of testing operations, and suitable scores 94 may be provided upon the upper surface of the tool supporting lever portion 58 for indicating adjusted positions of the scratching tool.

From the foregoing description it will be obvious that by clamping the rails 17 against movement, through the medium of the associated wing-nut bolts 29, and by rotating the crank 21 in one direction or the other, the slide 27, 28 and the supporting arm 49 and scratching tool mounted thereon can be moved in one direction or the other across the coated sample sheet mounted on the support 12 for making a test scratch thereon. If it is desired to impose a selected weight constant during the test scratching operation, a weight 69 of selective value is placed upon the arm 49, 58, or directly upon the tool standard 60 as shown in Figure 1, the weight supporting plate 90 and the counterweight 75 being adjusted in balance so as to impose no weight upon the scratching tool. Obviously, when the tool is to be moved thus, with the slides 17 thus held stationary, the cluster gear 31 is adjusted so that all of the gear portions 35, 36 and 37 thereof are out of mesh with the stationary rack 38. If desired, a selected weight 91 can be placed upon the supporting plate 90 held stationary as aforesaid so that this weight will be applied to the scratching tool carrying lever 49, 58 through the standard 89 and the rollers 92 as said lever is moved in one direction or the other beneath said rollers. In this manner the weight will be applied to the lever in uniformly increasing or diminishing degrees according to the direction of the movement imparted to the tool carrying lever 49, 58. It will be obvious also that the effect of the selected weight placed upon the plate 90 can be modified by placement of a suitably selected weight upon the tool standard 60 in the manner illustrated in Figure 1 of the drawings.

When all of the wing-nut bolt equipments are loosened so as to permit movement of the slides 17 and 27, 28 with which they are associated, rotation of the crank 21 will cause the slides 17 and 27, 28 to move relatively in opposite directions, the amount of the relative movement being determined by the particular gear ratio selected by adjustment of the cluster gear 31.

The particular scratching tool, or scratching edge, illustrated in Figures 1, 14 and 15, consists of a fine polished steel wire mounted in the V-groove of the disk in the manner hereinbefore described. A piece of .005" piano wire mounted on the edge of a disk 1" in diameter is preferred. This scratching edge has proven very useful, though, for optimum results, particularly for very thin films, such as the protective lacquers, enamels, applied interiorly to beer cans, a somewhat smaller radius of the scratching edge or diameter of the wire is desirable. In general, the finer the radius of the disk in relation to the thickness of the film under test, the more the properties of cohesion and adhesion are accentuated in the results of the test, while the larger relative radii of the edge, accentuate the surface properties of the film. If desired, each test can be made with a new and duplicable scratching edge by simply moving the disk 63 about its axis a distance sufficient to present a new surface of the wire for scratching purposes. The purchase of one spool of .005" piano wire, which is drawn to great accuracy, assures a supply of reproducible scratching surfaces over a period of years during which the machine is in use. Test scratches formed by the improved tool herein disclosed are sufficiently wide so that minor irregularities in the films under test do not seriously affect results. Again, in general, the greater the diameter of the disk used, the more such minor irregularities are averaged down into the final results, while smaller disks may be selected where it is desirable to show up such irregularities. Because of the relatively wide scratch produced by this improved tool, many of the physical properties of the films under test, such as brittleness, plasticity, toughness, et cetera, may be judged by direct visual observation of the characteristics of the scratch without the use of magnifying glasses or a microscope such as are frequently required when sharp points or the like are used as scratching tools.

In using the machine in making scratch tests the tool may be set in either of two ways. The disk may be placed at right angles to the direction of the scratch, or with the face of the disk set at an acute angle, about 20° to 25° to the direction of the scratch. The latter position has been found useful in testing plastic and gummy products which tend to pile up under the edges when it is set at right angles. When used at such an acute angle, the abraded material is thrown to one side somewhat in the manner of a plow turning a furrow. It is to be understood, of course, that while the present invention features the use of the particular form of scratching tool herein disclosed, the invention also comprehends the use of any other type of scratching tool, said other types of tools being found desirable for special work. For all around work, however, the scratching tool herein disclosed has been found most satisfactory.

One of the outstanding features of the machine herein disclosed is that of so relating the point of contact of the scratching tool with the sheet being tested and the point of support of the tool mounting arm, that drag or friction at the point of tool contact will neither augment nor reduce the scratching force and thereby result in test inaccuracies. Should the parts be so related that the plane within which the point of contact between the scratching tool and the surface being tested travels be placed a considerable distance above or below the plane within which the fulcrum point of the tool carrying arm is mounted, drag or friction would be set up at the point of contact between the scratching tool and the surface being scratched, and this drag or friction must of necessity either augment or reduce the force of the weight on the scratching tool, depending upon whether the tool is moving toward or away from said fulcrum point. Thus the pressure on the scratching tool, as determined by the weight imposed thereon, is altered on making the scratch and cannot be conveniently determined. The results would, therefore, be in error by an unknown amount. Such sources of error have been eliminated in the machine herein disclosed by so designing the mechanism that the plane in which the scratch is made, the fulcrum point of the tool supporting arm and the point of contact of the weight supporting wheels 92 with said arm are in substantially the same horizontal plane. As before stated, the support 12 upon which the test sample rests under the scratching tool is adjustable in height to meet any changes in the setting of the scratching tool or the size of the test sample. By including in this support a shallow tray, samples of lithography or the like may be conveniently tested while immersed in hot water or other liquids to determine their softening effects. The machine is so arranged that a complete test scratch may be made at any predetermined pressure differential upon the tool, beginning with any initial pressure desirable. In other words, a test scratch can be started at zero pressure, and the pressure can be uniformly increased as the scratch proceeds to, let us say, 5 lbs. pressure at the end of the scratch. This can be accomplished with a 10 lbs. weight on the supporting plate 90 of the movable weight carriage and no weights placed directly over the scratching tool. Or, for certain reasons, the scratch may be started at perhaps 1.5 lbs. pressure and finished at 2 lbs. pressure by placing a 1.5 lbs. weight on the tool standard 60 and a 1 lb. weight on the supporting plate 90.

In the machine assembly herein disclosed, the stroke limit is designed at approximately 5". The variable force on the scratching tool increases, on the full stroke, at the rate of $\frac{1}{10}$ the weight on the movable plate 90 per linear in. along the scratch since the horizontal distance from the scratching point to the fulcrum point of the tool arm 49, 58 is, in the disclosed design, exactly 10", and at each stroke the moving weight travels half the distance out on the arm 49. The maximum variable pressure is also equal to ½ the movable weight. The construction of the machine is such, however, that a movable weight of 40 to 50 lbs. can be handled, given a maximum variable force of approximately 25 lbs. At the other extreme, the sensitivity is such that a differential pressure of 0.01 lb. or less is not difficult to obtain. This would give a pressure change of only 0.002 lb. per inch on a full 5" scratch.

To put the machine in proper adjustment to make a normal scratch the scratching edge is set with its face at an angle of about 25° to the direction of the scratch. The lowest point of the scratching tool should be in a line with the track on top of the tool supporting arm 49 and it would then also be in line with the fulcrum point of said arm. The over-travel stops 56 engageable by the arm 49 are set so that the scratching tool is free to swing upwardly and downwardly ⅛" above or below the travel position of the supporting arm. Then with the tool supporting arm 49 level, the sample support 12 is adjusted so that the surface of the sample just touches the scratching tool, and the counterbalance 54 is adjusted so that the unloaded arm is in balance in a horizontal position. With the arm 49 level, the counterbalance 75 is adjusted so that the wheels 92 just contact the track provided by the upper surface of said arm. The proper weights are then placed on the machine in the manner hereinbefore described and in accordance with the tests intended, the cluster gear 31 is adjusted so as to impart the desired length of movement to the parts so as to provide for the making of a scratch of the length desired, and the machine is ready for operation.

In starting a scratch, the crank 21 is turned to set the wheels 92 directly over the fulcrum point of the tool supporting arm 49. This positioning of the wheels can be effected with facility by observation of the slide borne scores 93 best shown in Figure 2 of the drawings.

With the test sample in position and the machine set at the starting point, a slight tap on the arm 49 serves to mark the start of the scratch on the sample and determine the point from which measurements along the scratch are made when calculating the pressures on the scratching tool. A turn of the crank then serves to make a test scratch. The pressure at any point along a scratch is easily determined by measuring the distance from the starting point of the scratch and calculating the pressure which is thus equal to the sum of constant weight directly on the tool standard 60 plus the distance in inches of the point from the starting point of the scratch times the pressure change per inch. The pressure change per inch on the full scratch, as mentioned before, is always $\frac{1}{10}$ the weight on the movable weight support 90, or for the shorter scratches, to be described later, it may be either 2, 4 or 8 times this amount. For practically all control work only a very few simple weights are ever necessary, and simple scales may be made to read the pressures along the scratch directly. The machine is quite sensitive and it is possible to make very accurate observations on test samples over some limited range of pressures. Say, for example, that two similar coatings are shown by tests to fail completely between 1.6 and 1.8 lbs. A 1.5 lbs. weight can then be applied directly on the tool standard 60 and a 1 lb. weight on the movable supporting plate 90. The pressure over a full 5" scratch will then vary uniformly from 1.5 lbs. to 2.0 lbs. with a change of 0.1 lb. per inch, and pressures along the scratch can easily be determined to 0.01 lb. equal to 0.1 inch. Considerably smaller total differentials are, of course, possible for special work, with corresponding reduction in the total range of pressures covered in a single scratch.

A simple arrangement of racks and pinions which may move both the scratching tool and the weight supporting plate 90 independently may quickly and simply be set so as to produce scratches much longer than the maximum but always with the same pressure differential between the start and finish of a scratch as would be given by the same arrangement of weights for a full 5" scratch. In the particular machine herein illustrated test scratches ½, ¼, or ⅛ full stroke, namely 2½", 1¼" or ⅝" long may be selected always with the same pressure differential between start and finish. Obviously, at the same time, the rate of change of pressure per inch is then equal to 2, 4 or 8 times that which would be secured on a full length scratch.

In making a full 5" test scratch the weight supporting plate 90 remains fixed while the movement of the crank is effecting a movement of the scratching tool. In making the shorter scratches the parts cooperate in the manner hereinbefore described to cause the weight supporting plate 90 to move in one direction while the scratching tool is moving in the opposite direction. Thus each time, regardless of the length of the scratch, the plate supporting wheels 92 may travel the full distance out on the tool supporting arm 49. The largest cluster gear portion 35 is effective for accomplishing a ⅛ stroke, the intermediate gear portion 36 is effective for accomplishing a ¼ stroke, and the smallest gear portion 37 is effective for accomplishing a ½ stroke.

This machine, with the disclosed type of scratching tool, is also useful for determining the relative adhesion of various coatings to the base material. When used for this purpose the scratching edge is set at right angles to the direction of the scratch and the machine is operated with the scratcher moving in the reverse direction of that used in making a normal scratch test. A weight of sufficient value is placed on the movable weight supporting plate 90 so that with the tool supporting arm 49 fully retracted, the scratching edge is sure to fully penetrate the coating at the start of the test. Then, as the tool moves outward toward its normally balanced position, the force on the scratching edge decreases until a point is reached at which the edge rises and rides over the surface of the coating. The pressure at which this occurs is a measure of the adhesion of the given material to its base and is always considerably less than that required to completely break through the coating at a normal scratch test.

The balanced parallelogram structure 78, 79, 89 is so designed that no matter where the weight may be placed on the plate 90, the force downward on the wheels 92 which contact the arm 49 will always equal the weight on the plate. Obviously a similar mounting could be provided for the scratching tool if desired, and the invention comprehends this possible modification.

While the specific form of scratching element illustrated in Figures 14 and 15 is preferred, the invention is not to be considered as limited to the use of this specific form of element. The scratching edge can be formed other than by wrapping a wire round the edge of a disk. The present invention comprehends the provision of a scratching edge which constitutes a part of a curved surface however formed, whereas it has been the practice heretofore to use scratching tools having sharp edges, fine points or small spheres, etc. A scratching surface formed as a part of a surface of definite curvature, other than spherical, is considered desirable regardless of whether it be formed by casting, grinding, or by the use of the wire herein stressed. This wire surface, for example, can be said to be generated through the revolution of a circle of small radius, 0.005 inch, about an axis normal to the plane of the circle, on the end of a radius ½ inch from the axis of revolution.

It is of course to be understood that the details of structure and arrangement of parts may be variously changed and modified without departing from the spirit and scope of my invention.

I claim:

1. In a scratch resistance testing machine, a support for a coated test sample, said support having provision for holding a coating softening liquid in which the test sample can be immersed while being tested, means for maintaining the liquid at an elevated temperature, a sample scratching tool, and means for bringing about relative movement between the tool and said support for causing the tool to scratch the coated and immersed surface of said sample.

2. In a scratch resistance testing machine, a test sample support, a sample scratching tool, means for bringing about relative movement between the tool and said support for causing the tool to scratch said sample, said tool comprising a disk having a wire affixed about at least a portion of the peripheral edge thereof and constituting the scratching medium, and means mounting said disk adjustably so that the angle of the wire scratching medium relative to the line of the test scratch to be made can be altered.

3. In a scratch resistance testing machine, a test sample support, a sample scratching tool, a tool supporting lever fulcrumed at a point disposed substantially in the plane occupied by a test sample surface to be tested resting on said support, means mounted at a fixed position above and engageable with said lever for imposing a weight thereon during the test scratch forming operation, and means for moving the lever and its fulcrum and the tool relative to said support and said weight imposing means for causing the tool to scratch the sample and said weight imposition to occur in progressively increasing or decreasing degree according to the direction of movement of said lever.

4. In a scratch resistance testing machine, a test sample support, a sample scratching tool, a tool supporting lever fulcrumed at a point disposed substantially in the plane occupied by a test sample surface to be tested resting on said support, means engageable with said lever for imposing a weight thereon during the test scratch forming operation, and means normally effective for moving the lever and its fulcrum and the tool relative to said support and said weight imposing means for causing the tool to scratch the sample and said weight imposition to occur in progressively increasing or decreasing degree according to the direction of movement of said lever and including devices adjustable to be effective at other times for moving said weight imposing means and said lever and tool simultaneously in opposite directions relative to said support to provide scratching tool strokes of lesser lengths while maintaining said progressively increasing or decreasing degree of weight imposition.

5. In a scratch resistance testing machine, a base, a test sample support, a sample scratching tool, a fulcrumed tool supporting lever, means engageable with said lever for imposing a weight thereon during the test scratch forming operation, a slide slidably mounted on the base and supporting said lever and its fulcrum, a second slide slidably mounted on said base and supporting said weight imposing means, rack and pinion connections effective at times for simultaneously moving said slides relatively-oppositely for dragging the tool in scratching relation over said support and moving the lever relative to said weight imposing means so that the imposition of weight on the lever will progressively increase or decrease according to the direction of movement of said lever, and means for securing one said slide against movement to render the rack and pinion connections effective to move one slide only relative to the secured slide.

6. In a scratch resistance testing machine, a base, a test sample support, a sample scratching tool, a fulcrumed tool supporting lever, means engageable with said lever for imposing a weight thereon during the test scratch forming operation, a slide slidably mounted on the base and supporting said lever and its fulcrum, a second slide slidably mounted on said base and supporting said weight imposing means, rack and pinion connections effective at times for simultaneously moving said slides relatively-oppositely for dragging the tool in scratching relation over said support and moving the lever relative to said weight imposing means so that the imposition of weight on the lever will progressively increase or decrease according to the direction of movement of said lever, and means for securing one said slide against movement to render the rack and pinion connections effective to move one slide only relative to the secured slide, said rack and pinion connections including a selective gear couple effective to vary the relative movement imparted to said slides.

7. In a scratch resistance testing machine, a base, a test sample support, a sample scratching tool, a fulcrumed tool supporting lever, means engageable with said lever for imposing a weight thereon during the test scratch forming operation, a slide slidably mounted on the base and supporting said lever and its fulcrum, a second slide slidably mounted on said base and supporting said weight imposing means, means effective at times for simultaneously moving said slides relatively-oppositely for dragging the tool in scratching relation over said support and moving the lever relative to said weight imposing means so that the imposition of weight on the lever will progressively increase or decrease according to the direction of movement of said lever, and means for securing one said slide against movement to render the slide moving means effective to move one slide only relative to the secured slide, said slide moving means including a cross shaft rotatably mounted on one slide, means for imparting rotation to said shaft, a gear on said shaft enmeshed with a rack on the other of said slides, a second rack stationarily mounted on said base, and a cluster gear shiftable along said shaft and having gear portions of varied diameters selectively engageable with said second rack.

8. In a scratch resistance testing machine, a base, a test sample support, a sample scratching tool, a tool supporting lever, means forming a fulcrum for said lever, means engageable with said lever for imposing a weight thereon during the test scratch forming operation, a slide slidably mounted on the base and supporting said lever and its fulcrum, a second slide slidably mounted on said base and supporting said weight imposing means, means effective for moving said slide and the lever supported thereon for dragging the tool in scratching relation over said support and moving the lever relative to said weight imposing means so that the imposition of weight on the lever will progressively increase or decrease according to the direction of movement of said lever, and means for securing one said slide against movement to render the slide moving means effective to move one slide only relative to the secured slide, said slide moving means including a cross shaft rotatably mounted on one slide, means for imparting rotation to said shaft, a gear on said shaft enmeshed with a rack on the other of said slides, a second rack stationarily mounted on said base, a cluster gear shiftable along said shaft and having gear portions of varied diameters selectively engageable with said second rack, and means for mounting said second rack at selected elevations for meshing engagement with said selective gear portions.

9. In a scratch resistance testing machine, a test sample support, a sample scratching tool, a tool supporting lever fulcrumed at a point disposed substantially in the plane occupied by a test sample surface to be tested resting on said support, means engageable with said lever for imposing a weight thereon during the test scratch forming operation, and means for bringing about relative movement between the tool and said support for causing the tool to scratch said sample, said lever including a horizontally disposed portion lying substantially in the plane of the surface to be tested, and said weight imposing means including a weight supporting element, a standard depending vertically from said element and having wheels disposed to ride on the horizontally disposed portion of said lever, and horizontal parallel bar and hinge devices for supporting said vertical standard.

10. In a scratch resistance testing machine, a test sample support, a sample scratching tool, a tool supporting lever fulcrumed at a point disposed substantially in the plane occupied by a test sample surface to be tested resting on said support, means engageable with said lever for imposing a weight thereon during the test scratch forming operation, and means for bringing about relative movement between the tool and said support for causing the tool to scratch said sample, said lever including a horizontally disposed portion lying substantially in the plane of the surface to be tested, and said weight imposing means including a weight supporting element, a standard depending vertically from said element and having wheels disposed to ride on the horizontally disposed portion of said lever, and horizontal parallel bar and hinge devices for supporting said vertical standard, means for balancing the lever with the scratching tool at the intended point of contact with a test sample prior to commencement of a testing operation, and means for balancing the weight supporting element with the wheels just touching the lever prior to commencement of said testing operation.

11. In a scratch resistance testing machine, a test sample support, a sample scratching tool, a tool supporting lever fulcrumed at a point disposed substantially in the plane occupied by a test sample surface to be tested resting on said support, means engageable with said lever for imposing a weight thereon during the test scratch forming operation, and means for moving the lever and its fulcrum and the tool relative to said support and said weight imposing means for causing the tool to scratch the sample and said weight imposition to occur in progressively increasing or decreasing degree according to the direction of movement of said lever, said lever including a horizontally disposed portion lying substantially in the plane of the surface to be tested, and said weight imposing means including a weight supporting element, a standard depending vertically from said element and having wheels disposed to ride on the horizontally disposed portion of said lever, and horizontal parallel bar and hinge devices for supporting said vertical standard, means for balancing the lever with the scratching tool at the intended point of contact with a test sample prior to commencement of a testing operation, and means for balancing the weight supporting element with the wheels just touching the lever prior to commencement of said testing operation.

12. In a scratch resistance testing machine, a test sample support, a sample scratching tool, a tool supporting lever fulcrumed at a point disposed substantially in the plane occupied by a test sample surface to be tested resting on said support, means engageable with said lever for imposing a weight thereon during the test scratch forming operation, and means for moving the lever and its fulcrum and the tool relative to said support and said weight imposing means for causing the tool to scratch the sample and said weight imposition to occur in progressively increasing or decreasing degree according to the direction of movement of said lever or for moving said weight imposing means and said lever and tool simultaneously in opposite directions relative to said support to provide scratching tool strokes of lesser lengths while maintaining said progressively increasing or decreasing degree of weight imposition, said lever including a horizontally disposed portion lying substantially in the plane of the surface to be tested, and said weight imposing means including a weight supporting element, a standard depending vertically from said element and having wheels disposed to ride on the horizontally disposed portion of said lever, and horizontal parallel bar and hinge devices for supporting said vertical standard, means for balancing the lever with the scratching tool at the intended point of contact with a test sample prior to commencement of a testing operation, and means for balancing the weight supporting element with the wheels just touching the lever prior to commencement of said testing operation.

13. In a scratch resistance testing machine, a base, a test sample support, a sample scratching tool, a fulcrumed tool supporting lever, means engageable with said lever for imposing a weight thereon during the test scratch forming operation, said lever including a horizontally disposed portion lying substantially in the plane of the surface to be tested, and said weight imposing means including a weight supporting element, a standard depending vertically from said element and having wheels disposed to ride on the horizontally disposed portion of said lever, and horizontal parallel bar and hinge devices for supporting said vertical standard, means for balancing the lever with the scratching tool at the intended point of contact with a test sample prior to commencement of a testing operation, and means for balancing the weight supporting element with the wheels just touching the lever prior to commencement of said testing operation, a slide slidably mounted on the base and supporting said lever and its fulcrum, a second slide slidably mounted on said base and supporting said weight imposing means, rack and pinion connections effective at times for simultaneously moving said slides relatively-oppositely for dragging the tool in scratching relation over said support and moving the lever relative to said weight imposing means so that the imposition of weight on the lever will progressively increase or decrease according to the direction of movement of said lever, and means for securing one said slide against movement to render the rack and pinion connections effective to move one slide only relative to the secured slide.

14. In a scratch resistance testing machine, a sample scratching tool comprising a disk having a wire affixed about at least a portion of the peripheral edge thereof and constituting the scratching medium, and means fixedly but adjustably mounting said disk in a manner for permitting alteration of the position of said wire by partial turning of the disk to present a fresh unused portion thereof in scratching position whenever desired.

15. A coated sample scratching tool for use in scratch testing machines, said tool comprising a disk having a thin circular peripheral edge extending about approximately 180° and having an edge groove, said disk also having a flat face recess, a wire seated in and projecting from the groove and having its ends extended into said recess, and screw means for clamping said ends against the flat face in said recess.

NORMAN J. BENO.